United States Patent Office 3,557,092
Patented Jan. 19, 1971

3,557,092
PROCESS FOR PRODUCING 1,4-BENZODIAZE-
PINE-2-ONE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minooshi, Kazuo Mori, Kobe, and Tsuyoshi Kobayashi, Minoo-shi, Japan, assignors to Sumitomo Chemical Company, Ltd., Osaka, Japan
No Drawing. Filed Apr. 14, 1969, Ser. No. 816,074
Claims priority, application Japan, Apr. 15, 1968,
43/25,437
Int. Cl. C07d 53/06
U.S. Cl. 260—239.3    5 Claims

ABSTRACT OF THE DISCLOSURE 1,4-benzodiazepine-2-one derivatives represented by the formula,

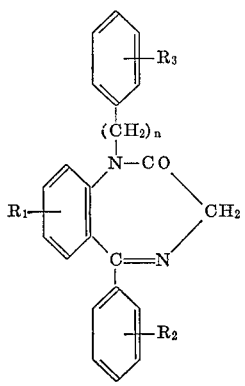

wherein $R_1$, $R_2$ and $R_3$ signify respectively a hydrogen atom or a halogen atom and $n$ signifies 0 or 1, and being effective as tranquillizers, muscle-relaxants and hypnotics, are produced by reacting with an oxidizing agent a 2-aminomethylindole derivative, or a salt thereof, represented by the formula,

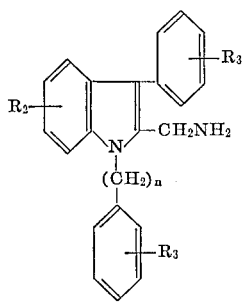

wherein $R_1$, $R_2$, $R_3$ and $n$ are as defined above.

This invention relates to a novel process for producing benzodiazepine derivatives and salts thereof, represented by the Formula I,

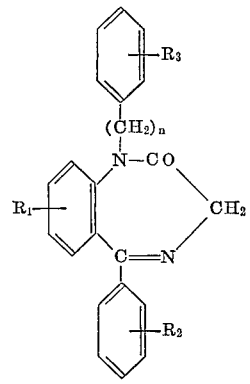

wherein $R_1$, $R_2$ and $R_3$ signify respectively a hydrogen atom or a halogen atom; and $n$ signifies 0 or 1.

In the compound represented by the aforesaid Formula I, the halogen atom includes chlorine, bromine, iodine and fluorine. The compounds represented by the Formula I are effective as tranquillizers, muscle-relaxants and hypnotics and are useful for medicines.

The present invention relates to a novel process for preparing a benzodiazepine derivative, or a salt thereof, represented by the Formula I by treating with an appropriate oxidizing agent a 2-aminomethyl indole derivative, or a salt thereof, represented by the Formula II,

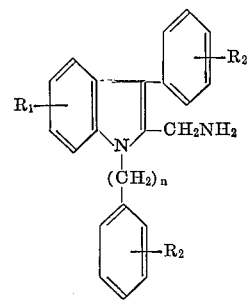

wherein $R_1$, $R_2$, $R_3$ and $n$ are as defined above in the Formula I. The 2-aminomethyl indole derivative, which is a starting material of the process of the present invention, is prepared, for instance, by following process; a 2-ethoxycarbonyl - 3 - phenyl indole derivative is treated with a halobenzene derivative or a benzyl halide derivative to give a 1-(p-phenyl or benzyl)-2-ethoxycarbonyl-3-phenyl indole derivative, and further, amidation of the 1-(p-phenyl or benzyl) - 2 - ethoxycarbonyl - 3 - phenyl indole derivative followed by reduction causes production of the 2-aminomethyl indole derivative represented by the Formula II. The 2-aminomethyl indole derivative can also be used in the form of an acid addition salt of an inorganic acid such as hydrochloric, sulfuric, nitric or phosphoric acid.

The present reaction is a formation of a benzodiazepine ring from an indole ring due to ring expansion, about which nobody has been able to anticipate before the present invention is developed. A few processes for producing these benzodiazepine derivatives have heretofore been described. For instance, it is known to obtain the benzodiazepine derivatives of the Formula I by treating an N-bromoacetyl derivative of 2-amino-benzophenone derivative with ammonia. (German Patent 1,136,709).

Contrary to this procedure, we have found, unexpectedly, that the benzodiazepine derivative of the Formula I can be smoothly and economically prepared by treating a 2-aminomethyl indole derivative having the Formula II, or a salt thereof, with an appropriate oxidizing agent. Examples of the oxidizing agent used in the present invention include ozone, hydrogen peroxide, peracetic acid, perbenzoic acid, chromic anhydride, potassium permanganate and the like.

The reaction is preferably effected in the presence of a solvent. Examples of the solvent include water, acetone, carbon tetrachloride, acetic acid and the like.

This reaction is desirably effected at a room temperature. If necessary, however, the reaction may be carried out at a lower or higher temperature.

The benzodiazepine derivative obtained according to the above-mentioned process may also be isolated in the form of an acid addition salt by treatment with an acid, e.g. a mineral acid such as hydrochloric, sulfuric, nitric, phosphoric or chromic acid, or an organic acid such as maleic, fumaric, succinic, formic or acetic acid.

According to the process of the present invention, there are produced such benzodiazepine derivatives and acid addition salts thereof as shown below.

1-(3'-chlorophenyl)-5-(2''-fluorophenyl)-7-chloro-1,3-dihydro-2H-1,4-benzodiazepine-2-one.
1-benzyl-5-phenyl-7-chloro-1,3-dihydro-2H-1,4-benzodiazepine-2-one.
1-(4'-chlorophenyl)-5-phenyl-7-chloro-1,3-dihydro-2H-1,4-benzodiazepine-2-one.
1-phenyl-5-phenyl-1,3-dihydro-2H-1,4-benzodiazepine-2-one.
1-(3'-chlorophenyl)-5-phenyl-7-chloro-1,3-dihydro-2H-1,4-benzodiazepine-2-one.
1-(o-chlorobenzyl)-5-phenyl-7-chloro-1,3-dihydro-2H-1,4-benzodiazepine-2-one.
1-(o-fluorobenzyl)-5-phenyl-7-chloro-1,3-dihydro-2H-1,4-benzodiazepine-2-one.
1-benzyl-5-phenyl-1,3-dihydro-2H-1,4-benzodiazepine-2-one.

Following examples are given to illustrate the present invention more particularly.

EXAMPLE 1

To a suspension of 1.0 g. of 1-(3'-chlorophenyl)-2-aminomethyl-3-(2''-fluorophenyl) - 5 - chloroindole in 15 ml. of acetic acid is added a solution of 1.0 g. of chromic anhydride in 1 ml. of water at 15° C. The reaction mixture is stirred for 20 hours at room temperature, then is poured into cold ammonia water. A separated product is extracted with carbontetrachloride and the extract is dried over sodium sulfate.

The solvent is removed under reduced pressure to a residue, which is recrystallized from ethanol to give 1-(3'-chlorophenyl) - 5 - (2'' - fluorophenyl) - 7 - chloro - 1,3-dihydro-2H-1,4-benzodiazepine-2-one. M.P. 90°–92° C.

EXAMPLE 2

To a suspension of 1.0 g. of 1-benzyl-2-aminomethyl-3-phenyl-5-chloroindole in 15 ml. of acetic acid is added a solution of 1.0 g. of chromic anhydride in 1 ml. of water at 20° C. The reaction mixture is stirred for 24 hours at room temperature, then is poured into cold ammonia water. A separated product is extracted with carbontetrachloride and the extract is dried over sodium sulfate. The solvent is removed under reduced pressure to a residue, which is recrystallized from isopropanol to give 1-benzyl-5-phenyl-7-chloro-1,3-dihydro - 2H - 1,4-benzodiazepine-2-one. M.P. 171°–173° C.

According to similar methods to that of examples, following compounds are obtained.

1-(4'-chlorophenyl)-5-phenyl-7-chloro-1,3-dihydro-2H-1,4-benzodiazepine-2-one.
1-phenyl-5-phenyl-1,3-dihydro-2H-1,4-benzodiazepine-2-one.
1-(3'-chlorophenyl)-5-phenyl-7-chloro-1,3-dihydro-2H-1,4-benzodiazepine-2-one.
1-(o-chlorobenzyl)-5-phenyl-7-chloro-1,3-dihydro-2H-1,4-benzodiazepine-2-one.
1-(o-fluorobenzyl)-5-phenyl-7-chloro-1,3-dihydro-2H-1,4-benzodiazepine-2-one.
1-benzyl-5-phenyl-1,3-dihydro-2H-1,4-benzodiazepine-2-one.

What we claimed is:

1. A process for preparing benzodiazepine derivatives, or acid addition salts thereof, represented by the formula,

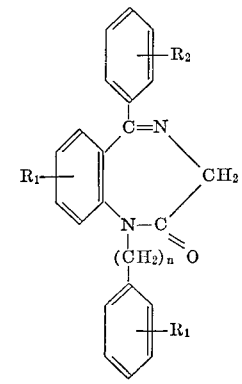

wherein $R_1$, $R_2$ and $R_3$ signify individually a hydrogen atom or a halogen atom; $n$ signifies 0 or 1; which process comprises contacting a 2-aminomethylindole derivative, or an acid addition salt thereof, represented by the formula,

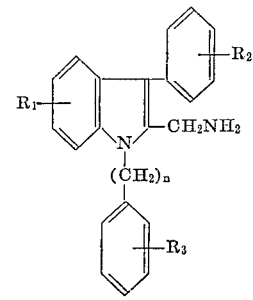

wherein $R_1$, $R_2$, $R_3$ and $n$ are as defined above, with at least the stoichiometric amount of an oxidizing agent selected from the group consisting of ozone, hydrogen peroxide, peracetic acid, perbenzoic acid, chromic anhydride and potassium permanganate, in the presence of a solvent.

2. A process according to claim 1, wherein the oxidizing agent is chromium anhydride and the reaction is carried out at a room temperature.

3. A process according to claim 1, wherein the solvent is water, acetone, carbon tetrachloride or acetic acid.

4. A process according to claim 1, wherein the acid in the acid addition salt of said benzodiazepine derivatives is hydrochloric acid, sulfuric acid, nitric acid, phosphoric acid, chromic acid, maleic acid, fumaric acid, succinic acid, formic acid or acetic acid.

5. A process according to claim 1, wherein the acid in the acid addition salt of said 2-aminomethylindole derivatives is hydrochloric acid, sulfuric acid, nitric acid or phosphoric acid.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.

260—326.13, 326.15